United States Patent [19]

Okada et al.

[11] Patent Number: 4,921,174
[45] Date of Patent: May 1, 1990

[54] SWITCH FOR ELECTRIC FOOD PROCESSOR

[75] Inventors: Yoshihisa Okada; Yoshihiro Enya, both of Komaki, Japan

[73] Assignee: Sanyei Corporation, Japan

[21] Appl. No.: 402,130

[22] Filed: Sep. 1, 1989

[30] Foreign Application Priority Data

Dec. 19, 1988 [JP] Japan .................................. 63-164591

[51] Int. Cl.⁵ ..................... A47J 44/00; B02C 18/12; B01F 7/16
[52] U.S. Cl. ..................... 241/37.5; 99/510; 99/537; 241/92; 241/282.1; 366/314; 366/601
[58] Field of Search ............... 99/485, 492, 348, 510, 99/537; 366/314, 347, 601; 83/665, 666, 592, 355; 241/37.5, 36, 92, 199.12, 282.1, 282.2; 200/50 A, 50 B

[56] References Cited

U.S. PATENT DOCUMENTS

| | | | |
|---|---|---|---|
| 4,194,697 | 3/1980 | Lembeck | 366/314 |
| 4,240,338 | 12/1980 | McClean | 99/503 |
| 4,297,038 | 10/1981 | Falkenbach | 366/601 |
| 4,410,280 | 10/1983 | Yamauchi et al. | 366/314 |
| 4,516,733 | 5/1985 | Funagura et al. | 83/355 |
| 4,672,160 | 6/1987 | Katoh | 200/50 A |
| 4,691,870 | 9/1987 | Fukunaga et al. | 241/37.5 |
| 4,711,167 | 12/1987 | Sano | 99/510 |
| 4,714,203 | 12/1987 | Williams | 241/37.5 |
| 4,716,823 | 1/1988 | Capdevila | 366/601 |
| 4,723,719 | 2/1988 | Williams | 241/282.2 |

Primary Examiner—Timothy F. Simone
Attorney, Agent, or Firm—Ostrolenk, Faber, Gerb & Soffen

[57] ABSTRACT

A food processor includes a main body with a graspable handle. A drive motor in the main body drives a shaft that projects up into a container and a rotor on the shaft processes food in the vessel. A cover removably disposed on the container is rotatable between an unlocked and a lockable position. An electric switch includes a switch lever pivotable up and down, and upon downward pivoting of the switch lever, the electric contacts to the motor are closed. A projection from the switch lever projects toward the body. A regulating member movable laterally of the body is contacted by the projection on the switch lever which prevents the switch lever from moving down. An operating piece projecting from the cover engages the regulating member and moves it out of the path of the projection. The operating piece on the cover has a cutout defined in it which receives the projection on the switch lever and enables the switch lever to be pivoted down to close the contacts. The engagement of the projection in the cutout on the operating piece locks the cover to the container, whereby so long as the switch activates the motor for driving the shaft for the rotor, the cover cannot be removed.

9 Claims, 4 Drawing Sheets

SWITCH FOR ELECTRIC FOOD PROCESSOR

BACKGROUND OF THE INVENTION

This invention relates to an electric food processor that slices, minces or grinds vegetables, or other food products, through the rotation of a rotary blade and particularly to a food processor of reduced size in which the switch for the electric motor can be switched on only after the cover over the rotary blade has been installed and its possible removal has been prevented.

Electric food processors are comprised of a number of elements. A main case or body receives the driving parts. An electric motor is disposed in the case. A rotary shaft driven by the motor is supported in the case in a rotatable manner. A container or vessel is installed freely detachably on the main case. The food material to be processed is fed into the container or vessel. A rotary blade, which is detachably supported on the rotary shaft, is located inside the container. A cover with a feed opening covers the upper end opening of the container where the rotary blade has been installed. When the food material to be processed is fed into the container through the feed opening in the cover, that food material is cut or chopped to the required size and shape by the rotating rotary blade.

In another application of the present assignee, entitled "Food Processor", Ser. No. 402,220, filed Sept. 1, 1989, operator safety is assured through providing an electric switch for the motor for the rotary blade that is operable only when the cover over the chamber in which the rotary blade rotates has been installed on the main body of the food processor. In that arrangement, the switch lever is operated by being moved or pressed downward toward the body. Means such as a bar blocks the switch from being moved down until the cover is installed. The cover moves the bar out of the way and ends the blockage of the motion of the switch lever. The switch lever can be pressed down when the bar is in a particular releasing location. Once the switch lever has been pressed down, the bar is held in the switch lever releasing location even if the cover is subsequently removed.

In particular, the switch lever has a depending projection on it and the bar has a hole in it for receiving the projection. The application of the cover to the main body moves the bar to a position where the switch lever projection aligns with the hole in the bar, and then the projection can be moved into the hole, which permits the switch lever to close the electric contacts to the motor and start the operation of the motor for the blade. Once the switch lever has been depressed, its projection holds the bar against returning to the position for blocking depression of the switch lever. The cover could then be removed from the body while the switch lever is depressed and the motor and rotary blade are still operating. As a result, the food material being processed may jump out of the processing vessel and the rotary blade will be exposed, with considerable danger.

SUMMARY OF THE INVENTION

It is the object of the present invention to eliminate the drawback of the food processor switch mechanism as described above. Another object of the invention is to provide an electric switch for operating the motor and therefore the rotary food processing element of the food processor only when the cover over the rotary element and over the food processing vessel in which the rotary element rotates has been installed on the main body and that controls the dismantling of the cover from the main body and disables the operation of the motor and the rotary food processing element when the cover is removed.

The food processor in which the switch of the invention is disposed comprises the following elements. There is a handle which is sized to be grasped. There is a main case or body supported by the handle in which a driving shaft is rotatably supported. A driving member like a motor rotatably drives the driving shaft. A rotary food processing element is detachably connected with the driving shaft. One form of such element is a food grinding tool. But the element may be a rotating blade. A planar bottom plate is detachably installed in the main body and the driving shaft projects through the bottom plate. The bottom plate has a peripheral wall with a cutout defined in it for enabling food discharge. The cutout extends around a part of the outer wall of the plate. The peripheral wall is of such a height as to at least accommodate the rotary blade. A cover having a discharge opening at a location that approximately corresponds to the location of the cutout in the peripheral wall of the bottom plate is placed at a part of the outer periphery of the cover. The cover has a feed opening. The cover is freely detachably mounted on the bottom plate and covers over the rotary food processing element and defines a cutting chamber between the cover and the bottom plate. The switch of the invention is operable to complete the electric circuit to supply electric power to the driving member or motor, for rotatably driving the rotary food processing element, but only after the cover has been installed over the bottom plate and only while the cover remains installed.

The switch comprises a switch lever which is supported to move up and down, and particularly to pivot up and down with respect to the main body of the food processor. The switch lever has an axial projection depending beneath it that is spaced away from the pivot axis of the switch lever and that extends toward the main body. In particular, that axial projection is located on the bottom of the free end of the switch lever.

There is a regulating member which is supported on the main body and which is located below the axial projection on the switch lever. The regulating member, which may be in the form of a bar, is movable to a first switch lever motion blocking position where the axial projection of the switch lever contacts the regulating member and the switch lever is prohibited from moving to the switch contacting, driving motor operating position. The regulating member is also movable to a second position at which it is out of the way of the axial projection so that the projection can pass the regulating member and move toward the main body, permitting the switch lever to move down to close the switch contacts to the motor for the food processing element. The regulating member bar is shifted laterally across the main body between its positions and generally on a path perpendicular to the motion of the axial projection on the switch lever. Elastic biasing means normally biases the regulating member to the first, axial projection blocking position.

The cover over the food processing chamber has a regulating member operating piece which contacts the regulating member for moving the regulating member to the second, switch lever motion enabling position when the cover is installed over the main body to cover the food processing chamber in which the food processing element is rotating. The operating piece of the cover has a cutout which engages the axial projection at the switch lever when the cover is installed and when the switch lever has been moved so that the axial projection has been moved toward the main body. This engagement holds the switch lever in the motor operating position when the cover is installed. Upon removal of the cover, the switch lever would not be operable.

With the switch structure described above, and with the cover not present on the food processor, the biasing means acts on the regulating member to move the regulating member to the first position, which prevents the switch lever from moving and particularly from pivoting to the motor operating position because of the engagement between the axial projection of the switch lever and the regulating member on the main body. With the regulating member in the first position, the switch lever cannot pivot or move when the switch lever is pushed toward the main body, and the motor remains shut off.

When the cover is placed over the main body, an operating piece defined on the cover shifts the regulating member to the second enabling position against the bias of the biasing means through the urging of the operating piece of the cover against the regulating member. This releases the switch lever motion blocking engagement between the axial projection on the switch lever and the regulating member. Now, the switch lever can be moved to close the circuit to operate the motor for driving the food processing element. When the switch lever is thereafter pressed into the motor operating condition, the axial projection on the switch lever engages a cutout part of the operating piece on the cover. So long as the switch lever remains in that cutout of the operating piece, the cover is locked to the main body by the projection from the switch lever and the cover cannot be removed from the main body. Removal of the cover from the main body is possible only when the switch lever has first been operated to disconnect the electric contacts to the motor, which removes the axial projection from the cutout in the operating piece on the cover and frees the cover for removal. Therefore, the switch lever has means on it which locks the cover to the main body when the switch lever is operating the motor and it is only upon release of the switch lever to the motor inactivated condition that the cover can be removed. This protects against food jumping out from inside the food processing chamber and prevents user contact with the rotary food processing element.

Other objects and features of the invention are described below with reference to the drawings.

DESCRIPTION OF A PREFERRED EMBODIMENT

The main case or body 3 of the electric food processor 1 has a handle 3a that is in the shape generally of a square cross-section pillar. The handle is integrally formed at its rear part. The handle has a semicylindrical, bottom, plate like part 3b that is integrally formed at its front or tip.

Figure 2:
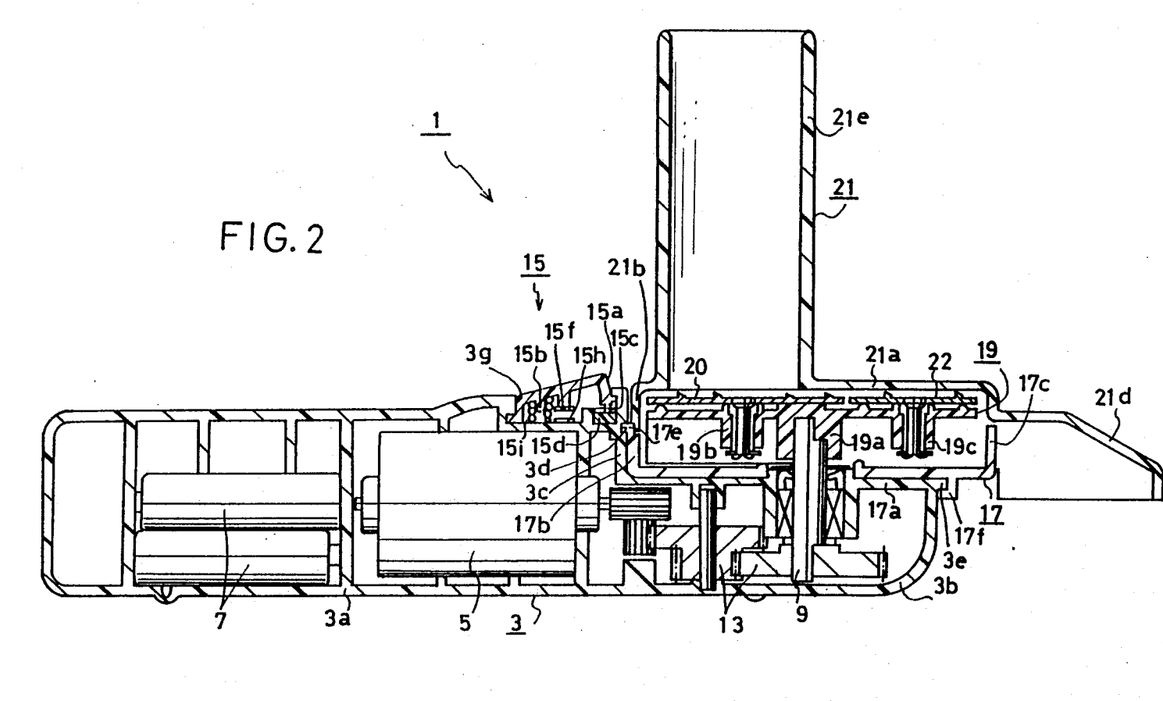
FIG. 2 is a central, vertical, cross sectional view of an assembled electric food processor including a switch according to the invention.

As shown in FIG. 2, an electric motor 5 serves as the driving member. A cell 7 is the electric battery for driving the electric motor 5. These are accommodated inside the handle 3a.

An upright blade driving shaft 9 is rotatably supported at semicylindrical plate part 3b. The shaft is directed perpendicular to the handle 3a. A series of meshed gear 11 and 13 drivingly connect the driving shaft 9 with the electric motor 5. Driving shaft 9 is rotatably driven at a required speed reduction ratio.

An engaging concave or lip 3d is formed on the erect wall 3c, which is between the handle 3a and the semicylindrical part 3b. At the front of the semicylindrical part 3b, there is an integrally formed engaging protrusion 3e.

Figure 3:
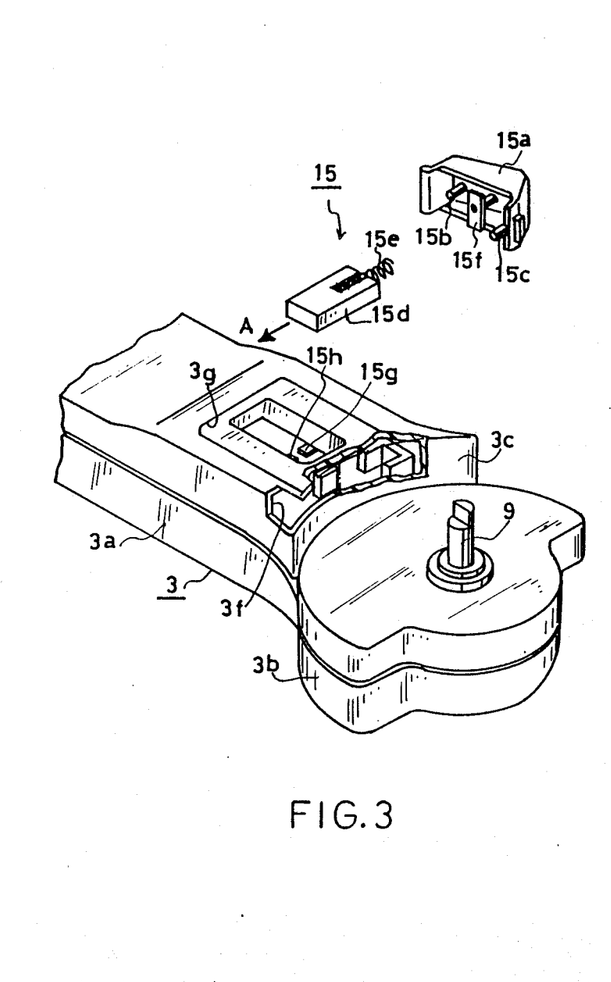
FIG. 3 is a dismantled perspective view showing the switch of the food processor.

At the top of the front end part of the handle 3a, there is an electric source switch mechanism 15. As shown in FIG. 3, a concave or receptacle 3f is formed on the upper surface of the handle 3a for receiving the switch mechanism 15.

At the upper surface of the handle 3a, which is the surface on which the switch mechanism 15 is provided, an opening 3f is formed, which cooperates with the switch mechanism, as described below. A concave area 3g is formed on the upper surface of and toward the front of the handle 3a.

A switch lever 15a is provided. The switch lever is in the form of a pressable, pivotable button, which rests in the concave area 3g. Its rear end serves as the pivot fulcrum for the switch lever or button. It has a front end which is movable and is engaged with the concave region 3b to regulate and control the removal of the switch lever from the main body.

On the bottom of the switch lever 15a, there is an integrally formed installation shaft 15b. A coil biasing spring 15i gives an upward bias to the switch lever at all times. The biasing spring is located between the installation shaft and the upper surface of the concave region 3g. A regulating shaft in the form of an axial projection 15c is provided on the bottom surface of the forward end or tip of the switch lever or button 15a. As the switch lever pivots, the axial projection or shaft 15c moves up and down, toward and away from the top of the handle 3a.

A regulating member or bar 15d is supported inside the main body just beneath the top of the handle 3a. It is supported in a guide channel there for movement laterally across the handle 3a at a right angle to the direction of extension of that handle. The regulating member 15d is normally biased in the direction of arrow A in FIG. 3 at all times by the compression spring 15e.

When the regulating member 15d is moved in the direction indicated by the arrow A to the first blocking position, the regulating shaft or projection 15c is positioned against the upper surface of the regulating member 15d, preventing a user from pressing down upon the switch lever 15a and thereby preventing operation of the motor for the food processor.

On the bottom of the switch lever 15a an electrode plate 15f is supported. The plate 15f is of a sufficient width to contact both of the electrodes 15g and 15h that are provided at the bottom of the recess 3g. Those electrodes are in the electric circuit to the driving motor for the shaft 9. Upon the electrode plate 15f moving down along with the switch lever and contacting both of the electrodes 15g and 15h, the electric circuit to the motor for the rotary shaft to the food processing element is completed and then that element will operate.

Figure 1:
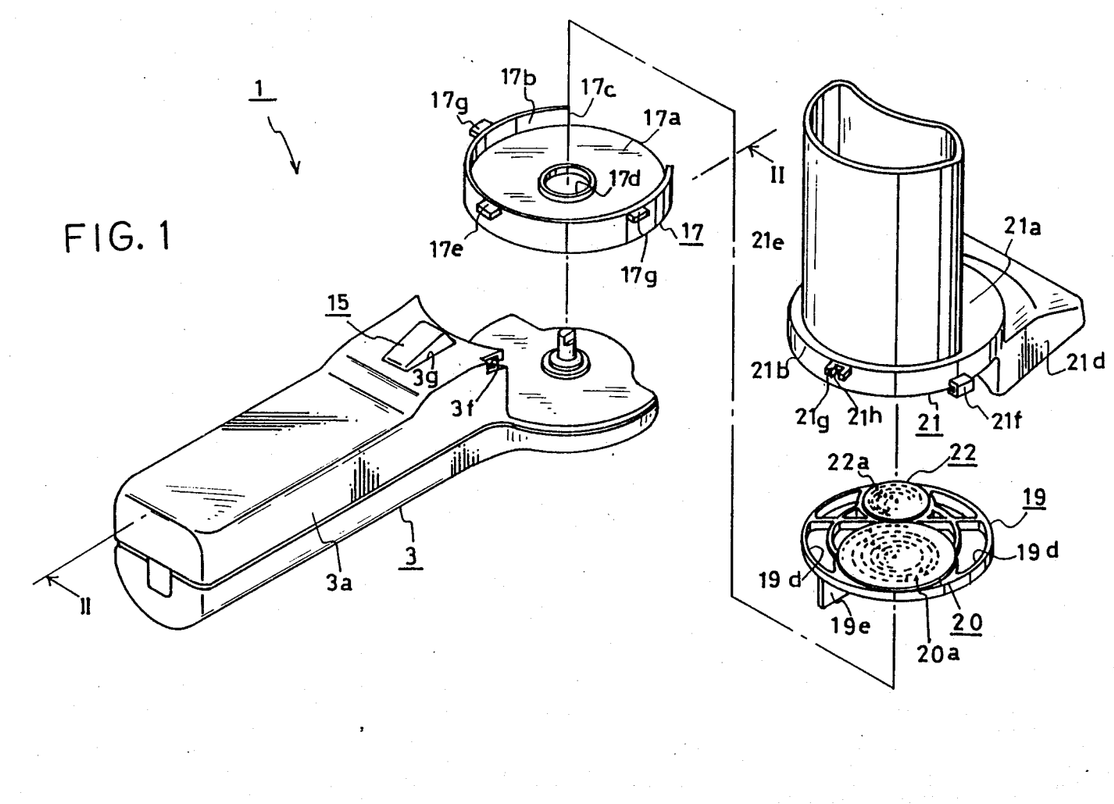
FIG. 1 is a perspective view of a dismantled electric food processor including a switch according to the invention.

Just above the upper surface of the semicylindrical plate like part 3b, a bottom plate 17 is installed in a freely detachable manner. The bottom plate 17 includes a peripheral support wall 17b that is of a height that is related to the height of the rotary food processing element 19, described below, for providing rotation clearance for the element. The wall 17b is integrally formed on the outer peripheral side of the approximately circular, planar bottom plate 17a of the plate 17. An arcuate cutout 17c is formed of a desired circumferential width at a part of the support wall 17b for permitting outlet of cut and processed food.

At the center of the planar plate 17a of the bottom plate 17, a through hole 17d is formed. It is located and is of such size as to permit the passage therethrough of the driving shaft 9 for the food processing element.

The support wall 17b includes an integrally formed engaging protrusion 17e that can engage with the engaging concave 3d for joining the plate 17 to the handle 3. On the lower surface of the front end of the planar plate 17a, there is an integrally formed engaging part 17f, with a cross section approximately in the shape of an 'L', which engages the engaging protrusion 3e, again for joining the plate 17 to the handle 3. On the outer periphery of the support wall 17b, there are two integrally formed engaging protrusions 17g at mutually opposite locations.

A rotor, particularly a rotary food processing element 19, is detachably installed on the driving shaft 9. The rotor is approximately in the shape of a disc. It includes a shaped boss 19a at its underside that is installed over a correspondingly shaped notch toward the top of the driving shaft 9. The boss is integrally formed on the lower surface of the rotor 19 and at its center.

First and second axial supports 19b and 19c are integrally formed at positions on the underside of the rotor 19 which are spaced radially out from the central boss 19a and are essentially diametrically opposite.

A plurality of arcuate segment holes 19d are formed through the rotor 19 except at the boss 19a and the axial supports 19b and 19c. Food material above the rotor that has been ground by the rotor passes through the open holes 19d to be discharged onto the bottom plate 17.

At the bottom of the rotor 19, there is a drop plate 19e that extends radially outwardly from the center and is integrally formed with the rotor. The lower end of that plate 19e may approach the upper surface of the planar plate 17a of the bottom plate 17. The drop plate may push the ground food material toward the discharge outlet from the bottom plate and the cover.

Rotary discs 20 and 22 each of different respective sizes are rotatably supported on the axial supports 19b and 19c, respectively. Grinding teeth are formed on the upper surface of the discs 20a and 22a and act upon the food above them by grinding upwardly. Then the food that has been ground passes through the openings 19d.

A cover 21 is installed freely detachably over the bottom plate 17. On the outer periphery of the plate part 21a of the cover 21, there is an integrally formed downward wall 21b. A cutout is formed in the wall 21b correspondingly located at and shaped to the cutout 17c and located at the front end of the wall 17b.

An integrally formed processed food ejection part 21d extends radially from the cover 21. It includes an opening downwardly at the planar part 21a at a location forward of and corresponding to the cutout in the cover.

Over a partial cylindrical part of the upper surface of the planar part 21a, an integrally formed, upwardly erect cylindrical part 21e is formed. It communicates into the interior of the food processor, and the food material to be processed or ground is fed through the cylindrical part 21e onto the discs 20 and 22.

Integrally formed at opposite sides around the outer periphery of the hang-down wall 21b, there are two engageable parts 21f. Their cross sections are approximately U-shaped. They are placed in opposition to the respective protrusions 17g on the plate 17 to lock the cover 21 to the plate 17 when the respective parts 17g and 21f are brought into engagement. At the outer periphery of the hang-down wall 21b, an operating piece 21g is integrally formed in such a manner as to approximately agree with and to extend into the opening 3f of the handle 3.

On the part of the outer periphery of the hang-down wall 21b circumferentially opposite the outlet opening 21d, an operating piece 21g is formed integrally in the cover and in such a manner as to be contactable with the regulating member 15d when the operating piece 21g is moved into the opening 3f. A cutout 21h is formed in the radially outward side of the operating piece 21g to enable the regulating axial projection 15c on the switch lever 15a to be inserted into that cutout 21h.

Figure 4:
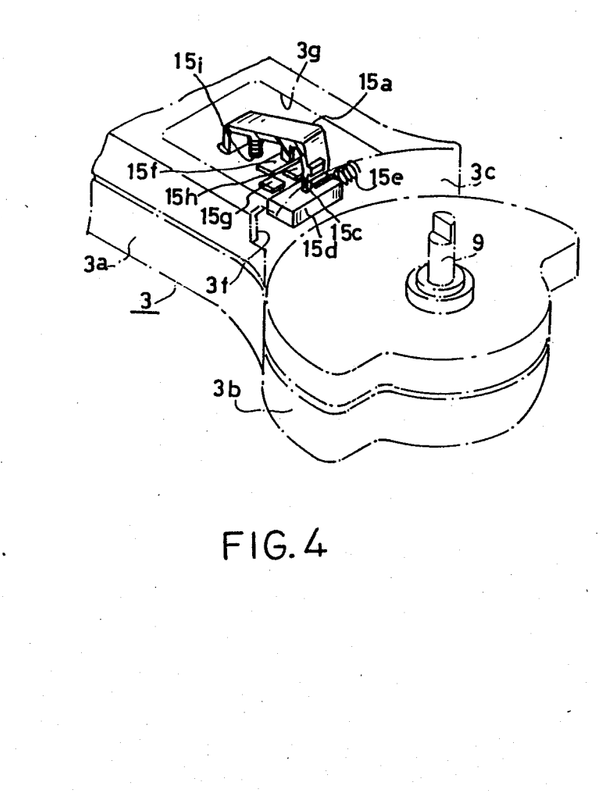
FIG. 4 is an assembled perspective view showing the OFF state of the electric source.
Figure 5:
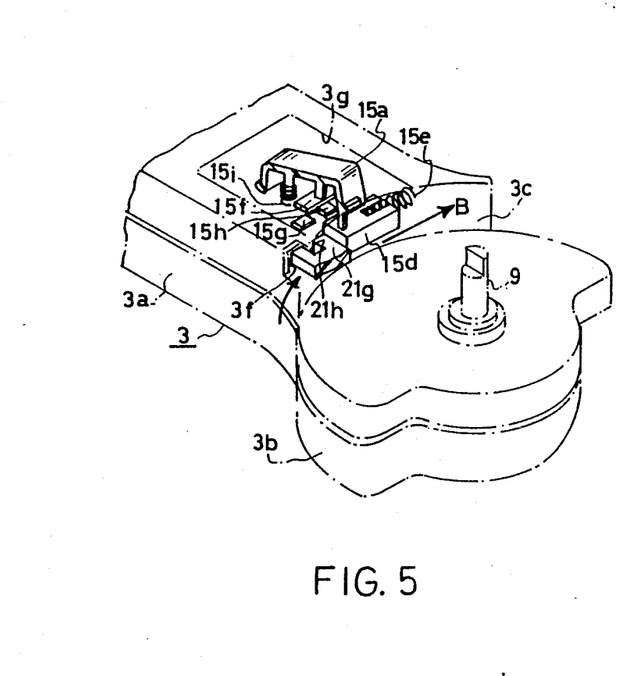
FIG. 5 is the same type of view as FIG. 4 showing an early stage in the ON state of the electric source.
Figure 6:
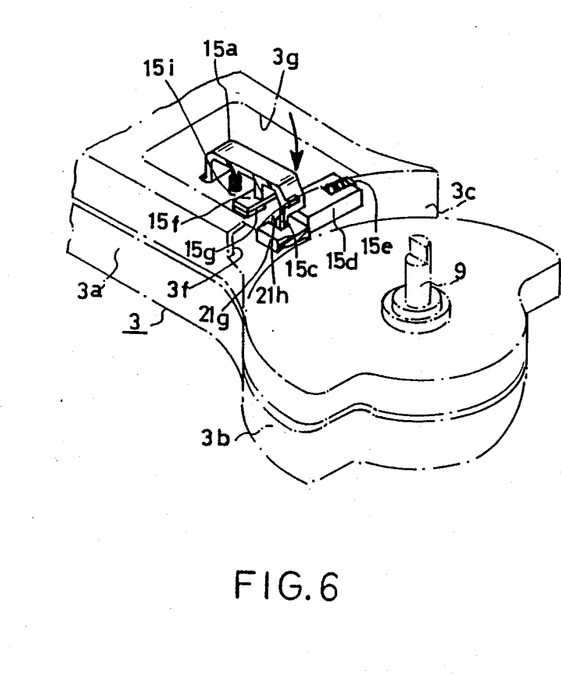
FIG. 6 shows the completed ON state of the electric source.

The operation of the electric food processor and of its switch 1 is explained with reference to FIGS. 4 through 6, which show the pushing in operation of the switch lever 15a. In FIG. 4, the regulating shaft or axial projection 15c is positioned against the upper surface of the regulating member 15d which has been moved to this first blocking contact position by the elasticity of the elastic member 15e. The cover 21 has not yet been installed on the main case or body 3. If the switch lever 15a is pressed down, its pivoting is prevented by the contact between the regulating member 15d and projection 15c. As the switch is open, the rotation of the rotor 19 by the electric motor 5 is prevented.

The bottom plate 17 is engaged with the upper surface of the semicylindrical plate part 3b. The engaging protrusion 17e is engaged with the engaging concave 3d, the driving shaft 9 is inserted through the hole 17d, and the engaging part 17f is engaged with the engaging protrusion 3d. In addition, the boss 19a of the rotor 19 is installed over the upper notched end of the driving shaft 9. The rotor 19 is surrounded by the peripheral support wall 17b of the bottom plate 17.

In the above described state in which the bottom plate 17 and rotor 19 have been installed, the cover 21 is placed and then rotated with respect to the semicylindrical part 3b to drive the operating piece 21g of the cover inside the opening 3f. The engaging protrusion 17g and the engageable part 21f are engaged which holds the cover to the main body. At the same time, the operating piece 21g that has entered the opening 3f contacts the regulating member 15d and moves that member in the direction shown by the arrow B in FIG.

5, in opposition to the elastic bias of the elastic member 15e.

This releases the contact of the regulating shaft 15c with the upper surface of the regulating member 15d. At the same time, axial projection or shaft 15c can enter the cutout part 21h of the operating piece 21g when those elements oppose each other. As a result, the switch lever 15a is enabled to be pushed down toward the main body.

When the switch lever 15a is pushed down now, the regulating shaft or projection 15c moves inside the cutout part 21h of the operating piece 21g. The resulting contact between the electrode plate 15f and the electrode plates 15g and 15h completes the electric circuit to operate the electric motor 5, which rotates the rotor 19 in the required direction. With the axial projection on regulating shaft 15c engaged inside the cutout 21h of the operating piece 21g, the cover 21 is prevented from being dismantled from the main case or body 3.

If a food item, such as a radish, etc. is fed through the cylindrical part 21e of the cover 21, the lower part of the food item contacts the rotary plates 20 and 22 of the rotating rotor 19. The rotation of the rotor 19 causes the food that has been thrown in to be guided and to contact and be ground by the grinding teeth 20a and 22a of the rotary discs 20 and 22. At the same time, the rotary discs 20 and 22 are rotated around their respective axial supports 19b and 19c which serve as their respective centers due to the mutilation resistance of the food being ground, thereby mutilating the fibers of the food that has adhered to the grinding teeth 20a and 22a. The rotary disc 22 has a smaller outer diameter and so is rotated at higher speed as compared with the rotation speed of the other larger diameter rotary disc 20. This enables accurate mutilation of the fibers of the food.

Even if the cover 21 has been erroneously rotated during the grinding operation, it is not possible to dismantle the cover 21 from the main body 3 because the regulating shaft or projection 15c is engaged with the cutout part 21h of the operating piece 21g, as described above. This prevents the rotor 19 that is rotating from being exposed outside and prevents the food that is being or that has been processed in the vessel from jumping outside.

In this invention, the pushing down of the switch lever 15a is permitted only when the protective cover 21 has been in installed on the main case or body 3. At the same time, any possible dismantling of the cover 21 from the main body 3 can be prevented. As a consequence, the rotor 19 will be prevented from rotating while the rotor 19 is exposed to the outside, thereby ensuring the safety of the operator.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. An electric switch for a food processor, wherein the food processor comprises a main body, a support on the main body, and a container for processed food, the container being disposed on the support, a shaft from the main body projecting into the container, a rotor for processing food the shaft being removably positionable upon the shaft in the container; and driving means in the body for driving the shaft and the rotor thereon to rotate;

a cover removably positionable over the container and over the rotor and the shaft, the cover also being movable with respect to the container between a first position at which the cover is emplaceable on and removable from the container and a second position at which the cover is to be affixed for closing the container;

a switch supported on the main body and including a switch lever that is movable toward and away from the main body; electric contacts on the main body connected with the driving means; means on the switch lever for engaging the contacts for completing the electric circuit to the driving means when the switch is moved toward the main body;

an element on the switch lever facing toward the main body, the element being movable toward the main body when the switch lever is moved toward the main body;

a regulating member disposed on the main body and movable across the main body and across the direction of that movement of the switch lever that is toward and away from the main body; the regulating member being shaped and being movable to a third position for the regulation member to normally be engaged by the element on the switch lever for blocking the element and thereby blocking the movement of the switch lever toward the main body and toward engaging the switch contacts; the regulating member being movable to a fourth nonblocking position out of the way of the element on the switch lever, wherein the regulating member permits movement of the switch lever toward the main body to engage the switch contacts;

an operating piece attached on the cover and movable with the cover as the cover is moved to the second position thereof, the operating piece being engageable with the regulating member for moving the regulating member to the fourth nonblocking position as the cover is moved to the second position;

a receptacle defined on the cover, and the receptacle being so placed that when the cover is moved to the second position, the receptacle becomes aligned with the element on the switch lever, and when the switch lever is then moved toward the main body, the element does not engage the regulating member, and the element instead engages in the receptacle, for locking the cover beneath the switch lever and locking the cover to the container for preventing removal of the cover from the container until the switch lever is moved away from the main body, which disengages the switch lever from the switch contacts and also frees the element from the receptacle which frees the cover for being moved to the first position.

2. The switch structure of claim 1, wherein the element of the switch lever comprises a projection therefrom shaped for reception in the cover receptacle.

3. The switch structure of claim 2, wherein the receptacle on the cover comprises a cutout defined in the cover into which the projection extends.

4. The switch structure of claim 3, wherein the operating piece which contacts and operates the regulating member includes the projection receiving cutout therein.

5. The switch structure of claim 2, further comprising biasing means normally urging the regulating member to the switch member projection blocking third position, and the operating piece engaging the regulating member to move the regulating member against the bias of the biasing means to the fourth position.

6. The switch structure of claim 5, wherein the regulating member is movable laterally across the main body, while the switch lever is movable toward and away from the main body.

7. The switch structure of claim 6, wherein the main body includes a handle; the switch and the contacts contacted by the switch lever are supported on the handle, the regulating member is supported on the handle near the container, and the container is supported to the handle.

8. The switch structure of claim 7, wherein the cover is disposable over the vessel and is rotatable around the vessel between the first and second positions and the operating piece is rotatable along with the cover.

9. The switch structure of claim 8, further comprising respective locking means defined on the container and on the cover for locking the cover to the container when the cover is rotated to the second position.

* * * * *

UNITED STATES PATENT AND TRADEMARK OFFICE
CERTIFICATE OF CORRECTION

PATENT NO. : 4,921,174

DATED : May 1, 1990

INVENTOR(S) : Yoshihisa Okada et al.

It is certified that error appears in the above-identified patent and that said Letters Patent is hereby corrected as shown below:

Column 7, Claim 1, line 6, change "shaft" to --rotor--;

Column 8, Claim 1, line 33, change "regulation" to --regulating--.

Add Claims 10-18 as follows:

--10. An electric switch for a food processor, wherein the food processor comprises a main body, a support on the main body, and a container for processed food, the container being disposed on the support, a shaft from the main body projecting into the container, a rotor for processing food, the rotor being removably positionable upon the shaft in the container, and driving means in the body for driving the shaft and the rotor thereon to rotate;

a cover removably positionable over the container and over the rotor and the shaft, the cover also being movable with respect to the container between a first position at which the cover is emplaceable on and removably from the container and a second position at which the cover is to be affixed for closing the container;

a switch supported on the main body and including a switch lever that is movable in a first and a second direction

UNITED STATES PATENT AND TRADEMARK OFFICE
CERTIFICATE OF CORRECTION

PATENT NO. : 4,921,174

DATED : May 1, 1990

INVENTOR(S) : Yoshihisa Okada et al.

It is certified that error appears in the above-identified patent and that said Letters Patent is hereby corrected as shown below:

with respect to the main body; electric contacts on the main body connected with the driving means; means on the switch lever for engaging the contacts for completing the electric circuit to the driving means when the switch is moved in the first direction with respect to the main body;

an element on the switch lever, the element being movable in the first direction with respect to the main body when the switch lever is moved in the first direction with respect to the main body;

a regulating member disposed on the main body and movable across the main body and across the direction of the movement of the switch lever in a first and a second direction with respect to the main body; the regulating member being shaped and being movable to a third position for the regulating member to normally be engaged by the element on the switch lever for blocking the element and thereby blocking the movement of the switch lever in the first direction with respect to the main body and toward engaging the switch contacts; the regulating member being movable to a fourth nonblocking position out of the way of the element on the switch lever, wherein the regulating member permits movement

UNITED STATES PATENT AND TRADEMARK OFFICE
CERTIFICATE OF CORRECTION

PATENT NO. : 4,921,174

DATED : May 1, 1990

INVENTOR(S) : Yoshihisa Okada et al.

It is certified that error appears in the above-identified patent and that said Letters Patent is hereby corrected as shown below:

of the switch lever in the first direction with respect to the main body to engage the switch contacts;

an operating piece attached on the cover and movable with the cover as the cover is moved to the second position thereof, the operating piece being engageable with the regulating member for moving the regulating member to the fourth nonblocking position as the cover is moved to the second position;

a receptacle defined on the cover, and the receptacle being so placed that when the cover is moved to the second position, the receptacle becomes aligned with the element on the switch lever, and when the switch lever is then moved in the first direction with respect to the main body, the element does not engage the regulating member, and the element instead engages in the receptacle, for locking the cover against moving with respect to the main body and locking the cover to the container for preventing removal of the cover from the container until the switch lever is moved in the second direction with respect to the main body, which disengages the switch lever from the switch contacts and also frees the element from the receptacle which frees the cover for being moved to the first position.

UNITED STATES PATENT AND TRADEMARK OFFICE
CERTIFICATE OF CORRECTION

PATENT NO. : 4,921,174

DATED : May 1, 1990

INVENTOR(S) : Yoshihisa Okada et al.

It is certified that error appears in the above-identified patent and that said Letters Patent is hereby corrected as shown below:

--11. The switch structure of claim 10, wherein the element of the switch lever comprises a projection therefrom shaped for reception in the cover receptacle.

--12. The switch structure of claim 11, wherein the receptacle on the cover comprises a cutout defined in the cover into which the projection extends.

--13. The switch structure of claim 12, wherein the operating piece which contacts and operates the regulating member includes the projection receiving cutout therein.

--14. The switch structure of claim 11, further comprising biasing means normally urging the regulating member to the switch member projection blocking third position, and the operating piece engaging the regulating member to move the regulating member against the bias of the biasing means to the fourth position.

--15. The switch structure of claim 14, wherein the regulating member is movable laterally across the main body, while the switch lever is movable in the first and second directions with respect to the main body.

UNITED STATES PATENT AND TRADEMARK OFFICE
CERTIFICATE OF CORRECTION

PATENT NO. : 4,921,174

DATED : May 1, 1990

INVENTOR(S) : Yoshihisa Okada et al.

It is certified that error appears in the above-identified patent and that said Letters Patent is hereby corrected as shown below:

--16. The switch structure of claim 15, wherein the main body includes a handle; the switch and the contacts contacted by the switch lever are supported on the handle, the regulating member is supported on the handle near the container, and the container is supported to the handle.

--17. The switch structure of claim 16, wherein the cover is disposable over the vessel and is rotatable around the vessel between the first and second positions and the operating piece is rotatable along with the cover.

--18. The switch structure of claim 17, further comprising respective locking means defined on the container and on the cover for locking the cover to the container when the cover is rotated to the second position.--

Signed and Sealed this

Fifth Day of May, 1992

Attest:

DOUGLAS B. COMER

*Attesting Officer*  Acting Commissioner of Patents and Trademarks